US006952595B2

(12) United States Patent
Ikedo et al.

(10) Patent No.: US 6,952,595 B2
(45) Date of Patent: Oct. 4, 2005

(54) DIGITAL BROADCAST CHANNEL RECEPTION SYSTEM AND METHOD AND PORTABLE TERMINAL FOR USE IN SUCH SYSTEM

(75) Inventors: Hiroyasu Ikedo, Yokohama (JP); Takatoshi Shirosugi, Chigasaki (JP); Hiroyuki Mizukami, Yokohama (JP); Ikuo Murata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 10/255,098

(22) Filed: Sep. 26, 2002

(65) Prior Publication Data

US 2003/0072257 A1 Apr. 17, 2003

(30) Foreign Application Priority Data

Sep. 26, 2001 (JP) ........................................ 2001-292787

(51) Int. Cl.⁷ ............................................... H04M 1/00
(52) U.S. Cl. ................ 455/553.1; 455/41.2; 455/556.1; 455/3.06
(58) Field of Search ........................ 455/41, 410, 556.1, 455/553; 370/338; 701/29; 709/208, 223

(56) References Cited

U.S. PATENT DOCUMENTS

| | | | | |
|---|---|---|---|---|
| 6,055,468 | A | * | 4/2000 | Kaman et al. ................. 701/29 |
| 6,751,473 | B1 | * | 6/2004 | Goyal et al. .............. 455/556.1 |
| 2001/0055951 | A1 | * | 12/2001 | Slotznick ...................... 455/41 |
| 2002/0077077 | A1 | * | 6/2002 | Rezvani et al. .............. 455/410 |
| 2002/0078161 | A1 | * | 6/2002 | Cheng ......................... 709/208 |
| 2002/0080753 | A1 | * | 6/2002 | Lee ........................... 455/556.1 |
| 2002/0120728 | A1 | * | 8/2002 | Braatz et al. ................ 709/223 |
| 2002/0173339 | A1 | * | 11/2002 | Safadi ......................... 455/553 |

OTHER PUBLICATIONS

Journal of Institute of Image Information and Television Engineers (ITE). vol. 53, No. 11, pp. 1456–1459 (1999).
Journal of the ITE, vol. 52, No. 11, pp. 1551–1553 (1998).
Journal of the ITE, vol. 53, No. 11, pp. 1479–1484 (1999).
Journal of the ITE, vol. 52, No. 11, pp. 1549–1550 (1998).
Journal of the ITE, vol. 52, No. 11, pp. 1539–1545 (1998).

* cited by examiner

*Primary Examiner*—Stephen M. D'Agosta
(74) *Attorney, Agent, or Firm*—McDermott Will & Emery LLP (57) ABSTRACT

A digital broadcast channel reception system and a portable terminal allow watching a digital broadcast on the terminal. In the examples, a receiver unit for receiving digital broadcasts transmits video data to a display unit, using its TX data manipulator, modulator, TX circuit, and antenna. The TX data manipulator manipulates the output from an OFDM demodulator into data to transmit from the TX circuit and appends error correction codes to the data. The modulator modulates the output from the TX data manipulator. A display unit for digital broadcast display receives video data transmitted from the receiver unit, using its antenna, TX/RX section, and modulator/demodulator. After error correction codes in the received signals are decoded by a TX/RX data manipulator, video data is extracted. After the video data is decoded by a MPEG4 decoder, a picture is output on the display.

11 Claims, 10 Drawing Sheets

FIG. 1(a)
PORTABLE TERRESTRIAL DIGITAL BROADCAST RECEIVER UNIT

PORTABLE TERRESTRIAL DIGITAL BROADCAST RECEIVER UNIT

FIG. 4(b)
PORTABLE TERRESTRIAL DIGITAL BROADCAST DISPLAY UNIT

FIG. 5(a)

FIG. 5(b)
PORTABLE TERRESTRIAL DIGITAL BROADCAST DISPLAY UNIT

FIG. 6

DIGITAL BROADCAST CHANNEL RECEPTION SYSTEM AND METHOD AND PORTABLE TERMINAL FOR USE IN SUCH SYSTEM

BACKGROUND OF THE INVENTION

The present invention relates to a digital broadcast channel reception system. More particularly, the invention relates to a portable digital broadcast channel reception system that allows watching a digital broadcast on a mobile terminal such as a portable cellular telephone or a personal digital assistance (PDA).

In Japan, digital broadcasting is now promoted and CS and BS digital broadcasting services are carried out. Moreover, satellite digital audio broadcasting, terrestrial digital television broadcasting, and terrestrial digital audio broadcasting services are planned to be implemented in near future.

In the terrestrial digital television broadcasting, an Orthogonal Frequency Division Multiplexing (OFDM) method is used. In the OFDM method, a transmission bandwidth allocated for transmission line coding is divided into 13 segments which are, in turn, classified into a maximum of three hierarchies. For each hierarchy, parameters for required transmission characteristics such as a coding rate for codes within carrier modulation (DQPSK, QPSK, 16QAM, 64QAM) are specified. As for one central segment of the 13 segments, it is possible to receive the broadcast service, using a portable terminal or the like receiving that segment only (Journal of the Institute of Image Information and Television Engineers (ITE), Vol. 53, No.11, pp. 1456–1459 (1999)).

In the terrestrial digital audio broadcasting for audio priority over video, three center segments of the 13 segments are used (Journal of the ITE, Vol. 53, No. 11 pp. 1479–1484 (1999)).

In the case of the terrestrial digital audio broadcasting also, as for one central segment of the three segments, it is possible to receive the broadcast service, using a portable terminal or the like receiving that segment only.

As for information encoding methods for digital broadcasting services, Moving Picture Experts Group (MPEG) 1, MPEG2, and MPEG4 are thought to be used for data encoding (Journal of the ITE, Vol. 52, No. 11 pp. 1551–1553 (1998)).

In the case of satellite and terrestrial digital audio broadcasting, MPEG4 audio encoding is thought to be used for audio encoding (Journal of the ITE, Vol. 52, No. 11 pp. 1549–1550 (1998)).

As for terminals capable of partially receiving the service of terrestrial digital broadcasting, those that can receive the broadcasting service while moving in a compatible mode with portable cellular telephone or mobile terminal functionality are expected to be used (Journal of the ITE, Vol. 52, No. 11 pp. 1539–1545 (1998)).

SUMMARY OF THE INVENTION

However, a specific configuration of a terminal capable of receiving such digital broadcasting has not been described. If a slim and light terminal such as a portable cellular telephone is made compatible with digital broadcast receiving functionality, the terminal would become heavier so that it is hard for the user to operate in hand, which is one conceivable problem. For the terminal provided with both the function of receiving digital broadcasts while moving and portable cellular telephone or mobile terminal functionality, another problem is that the battery consumption increases and call wait time and speech time during the cellular telephone use decrease.

Furthermore, the portable terminal will need to be provided with functions for receiving a service of distributing digital broadcasts to portable terminals, which is expected to be implemented in near future.

To solve the above problems, the present invention has been made. The object of the invention is to provide a digital broadcast channel reception system that allows watching a digital broadcast on a mobile terminal such as a portable cellular telephone or a PDA and a portable terminal as a constituent part of such system.

To achieve the foregoing object, a digital broadcast channel reception system comprising a receiver unit and a display unit is provided. The receiver unit comprises digital broadcast receiving means for receiving digital broadcast carriers, demodulation means for demodulating the digital broadcast carriers received by the digital broadcast receiving means, first conversion means for converting encoded digital signals demodulated by the demodulation means into radio communication signal carriers in a predetermined form, and first radio carriers transmitting/receiving means for transmitting the radio communication signal carriers output by the first conversion means. The display unit, which is equivalent in functionality to a mobile portable terminal, comprises second radio carriers transmitting/receiving means for receiving the carriers transmitted by the first radio carriers transmitting/receiving means, second conversion means for converting the radio communication signal carriers received by the second radio carriers transmitting/receiving means into signals in the same form as the above encoded digital signals, decoding means for decoding the signals output by the second conversion means, and display means for displaying content reproduced from the decoded signals output by the decoding means.

BRIEF DESCRIPTION OF THE DRAWINGS

These and other features, objects, and advantages of the present invention will become more apparent from the following description when taken in conjunction with the accompanying drawings wherein:

FIG. 1 consists of block diagrams of FIGS. 1A and 1B of a portable terrestrial digital broadcast reception system according to a preferred Embodiment 1 of the present invention, FIG. 1A showing its receiver unit and FIG. 1B showing its display unit.

FIG. 4 consists of block diagrams of FIGS. 4A and 4B of a portable terrestrial digital broadcast reception system according to a preferred Embodiment 2 of the present invention, FIG. 4A showing its receiver unit and FIG. 4B showing its display unit.

FIG. 5 consists of block diagrams of FIGS. 5A and 5B of a portable terrestrial digital broadcast reception system according to a preferred Embodiment 3 of the present invention, FIG. 5A showing its receiver unit and FIG. 5B showing its display unit.

DETAILED DESCRIPTION OF THE PREFERRED EMBODIMENTS

Preferred embodiments of the present invention will now be described, using the accompanying drawings. FIG. 1 shows the structural diagrams of a receiver unit and a display unit constituting a portable digital broadcast reception system according to a preferred Embodiment 1 of the present invention. Hereon, for digital broadcasting to be received, we assume that terrestrial digital television broadcasting is partially received by the system. The system configuration in a case where a portable cellular telephone is used as its display unit is shown.

Figure 1A:
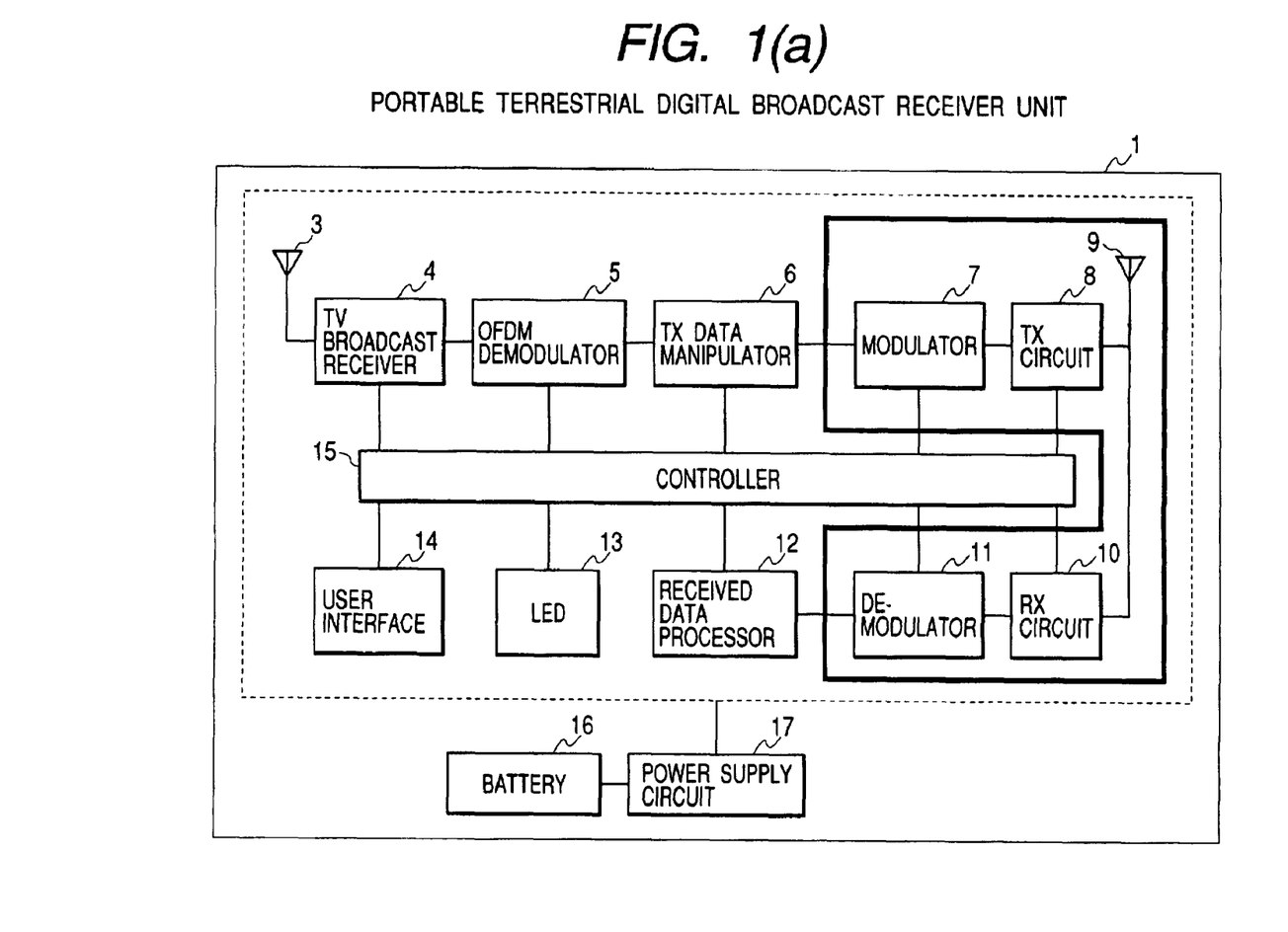

As is shown in FIG. 1A, the portable terrestrial digital broadcast receiver unit 1 receives terrestrial digital broadcast radio carriers transmitted from a broadcasting station (not shown) by an antenna 3 from which the radio carriers are input to a TV broadcast receiver 4. According to channel selection data which will be described later, a desired channel is received and converted into intermediate frequency signals. The received intermediate frequency signals are demodulated by an OFDM demodulator 5, where the signals in one central segment out of the 13 segments of the bandwidth of the received channel are demodulated and error correction codes are decoded. The output signals are MPEG4-encoded video data signals (may include audio signals in some case). The video data signals are then encoded by a transmission (TX) data manipulator 6, according to a radio transmission protocol between the portable terrestrial digital broadcast receiver unit 1 and the portable terrestrial digital broadcast display unit 2. The TX data manipulator 6 appends error correction codes to the encoded video data signals. The resultant signals are input to a modulator 7 and digitally modulated. A transmission (TX) circuit 8 converts the thus modulated signals into radio frequency (RF) carriers of the video on a determined radio channel and transmits the RF video carriers from an antenna 9 to the portable terrestrial digital broadcast display unit 2.

The portable terrestrial digital broadcast receiver unit 1 receives a channel to be selected in either of the following two methods. One method would be to directly enter a channel number to receive, using a user interface 14 having numeral keys and others. Another method would be to receive a channel specified by channel selection data from the portable terrestrial digital broadcast display unit 2. The channel selection data will be described later.

The latter method will be detailed. Channel selection signal carriers which will be described later from the portable terrestrial digital broadcast display unit 2 are input to a reception (RX) circuit 10 via the antenna 9. They are converted into intermediate frequency signals which are in turn digitally modulated by the modulator 11. The received and digitally modulated signals are error corrected by a received data processor 12 and a control signal portion is extracted therefrom. Moreover, the received data processor 12 determines what control data is derived from the control signal portion that includes channel selection data in this case. As the result of this determination, once channel selection data has been obtained, the TV broadcast receiver 4 can receive the desired channel specified by this data under the control of a controller 15. The controller 15 has a microcomputer as its main control part and implements the function of controlling all the components of the receiver unit.

As a power supply to the portable terrestrial digital broadcast receiver unit 1, a battery 16 is used. Battery power is supplied via a power supply circuit 17 to the components when a power switch (not shown) is placed to the ON position.

Figure 1B:
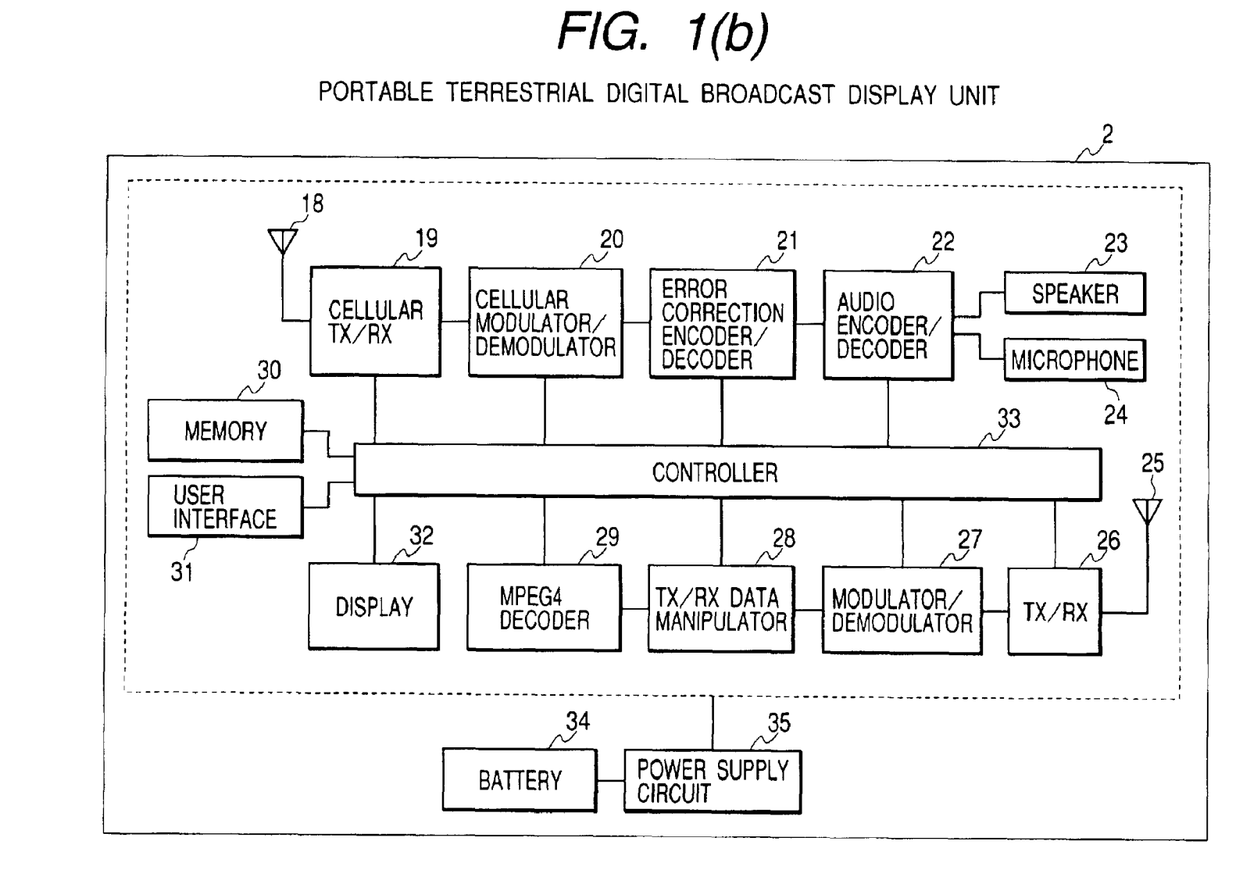

As is shown in FIG. 1B, the portable terrestrial digital broadcast display unit 2 is provided with portable cellular telephone functionality. Radio communication signal carriers transmitted from a base station (not shown) are received by an antenna 18 from which the carriers are input to a cellular TX/RX section 19 where they are converted into intermediate frequency signals. The received intermediate frequency signals are digitally demodulated by a cellular modulator/demodulator 20 and the received and digitally demodulated signals are decoded by an error correction encode/decoder 21. Signals decoded and output by the error correction encoder/decoder 21 are classified as two types: digital speech signals and video data signals encoded by MPEG4. The video data signals encoded by MPEG4 are decoded by an MPEG4 decoder 29 and the reproduced motion picture is output on a display 32. On the other hand, the digital speech signals are decoded by an audio encoder/decoder 22, reconverted into analog speech signals which are output from a speaker 23 of the handset.

Inversely, voice to send is converted into speech signals by a microphone 24, encoded by the audio encoder/decoder 22, thereby converted into digital speech signals. The digital speech signals are encoded by the error correction encoder/decoder 21 and input to the cellular modulator/demodulator 20 where they are digitally modulated. The cellular TX/RX section converts the thus modulated speech signals into RF carriers of speech signals on a predetermined radio channel and transmits the RF carriers of speech signals from the antenna 18 to a base station. Because it is conceivable that the antenna 3 for receiving terrestrial digital broadcast carriers becomes larger than the antenna 18 of the portable cellular telephone, the antenna 3 is provided separately from the antenna 18 of the portable telephone and this enhances the portability.

The controller 33 has a microcomputer as its main control part and implements the function of controlling all the components of the display unit. In addition, to implement portable cellular telephone functionality, the controller 33 has means for generating a message to be sent to a destination terminal, storing the message into the memory 30, and transmitting the message to the destination terminal. Also, the controller 30 is able to output messages received over a cellular network and information received via the Internet to the display 32.

While the display unit implements the above portable cellular telephone functionality, when the user is going to watch a terrestrial digital broadcast, the user must switch its operation to a mode of transmitting channel selection data to the above-described portable terrestrial digital broadcast receiver unit 1 with the user interface 31. Using the numeral keys included in the user interface 31, the user must enter a channel number to receive. A TX/RX data manipulator 28 encodes the entered channel selection data, according to the radio transmission protocol between the portable terrestrial digital broadcast display unit 2 and the portable terrestrial digital broadcast receiver unit 1. The TX/RX data manipulator 28 appends error correction codes to the encoded channel selection data. The resultant signals of channel selection data are input to a modulator/demodulator 27 and digitally modulated. Then, a TX/RX section 26 converts the modulated signals of channel selection data into RF signal carriers on a predetermined radio channel which are, in turn, transmitted from the antenna 25 to the portable terrestrial digital broadcast receiver unit 1.

When video data on the selected channel is transmitted from the portable terrestrial digital broadcast receiver unit 1 to the portable terrestrial digital broadcast display unit 2, how the display unit operates will be described below. The video data from the portable terrestrial digital broadcast receiver unit 1 is received by the antenna 25 from which it is input to the TX/RX section 26 where it is converted into intermediate frequency signals. The received intermediate frequency signals are digitally demodulated by the modulator/demodulator 27. The received and digitally demodulated signals are error corrected by the TX/RX data manipulator 28 and video data signals are extracted therefrom. The signals demodulated and output by the TX/RX data manipulator 28 maybe either video data signals encoded by MPEG4 or control signals received including error information or the like. Thus, the TX/RX data manipulator has the function of determining what type of data received. According to the determination of the TX/RX data manipulator 28, the video data signals if processed are then decoded by the MPEG4 decoder 29 and the reproduced motion picture is output on the display 32. On the other hand, the control signals if processed are supplied to the controller 33 so that the display unit makes an appropriate error indication such as uttering an alarm sound from a sounder (no shown) or presenting an error message on the display 32. As a power supply to the portable terrestrial digital broadcast display unit 2, a battery 34 is used. Battery power is supplied via a power supply circuit 35 to the components when a power switch (not shown) is placed to the ON position. Although audio signals are not described in this embodiment, it is possible to process them in the same manner if the display 32 is provided with an audio function as a speaker.

Figure 2:
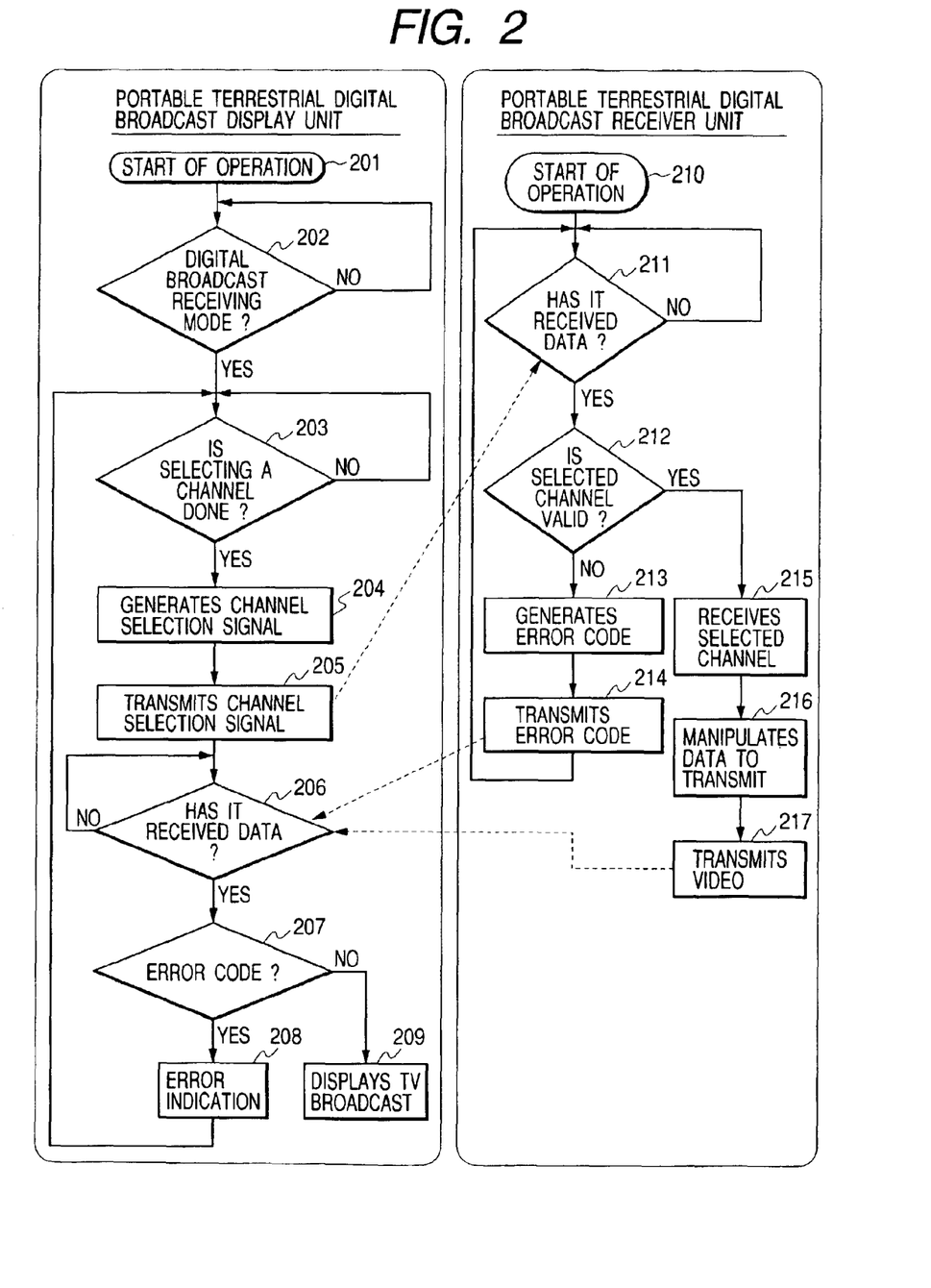
FIG. 2 is a flowchart explaining the primary operation of the portable terrestrial digital broadcast reception system of Embodiment 1.

Then, the primary operation of the portable terrestrial digital broadcast reception system of the present invention will be explained, using FIG. 1 and FIG. 2 that illustrates an operation flow in the primary phase.

Assume the user carries the portable terrestrial digital broadcast receiver unit 1 in a bag or the like and places its power switch (not shown) to the ON position beforehand. When the power switch is turned ON, the power is supplied to the components within a block marked off with dotted lines in FIG. 1A via the power supply circuit 17 and the receiver unit enters the state that it is ready to receive a channel selection signal from the portable terrestrial digital broadcast display unit 2 (210, 211). Assume that the user carries the portable terrestrial digital broadcast display unit 2 in hand or in a pocket or the like from which the user can readily take it in hand and places the power switch (not shown) to the ON position beforehand or when it is used. When the power switch is turned ON, the power is supplied to the components within a block marked off with dotted lines in FIG. 1B via the power supply circuit 35 and the display unit operates as a portable cellular telephone (201).

To watch a terrestrial digital broadcast, the user switches the operation to the mode of transmitting channel selection data to the portable terrestrial digital broadcast receiver unit 1 by operating the user interface 31. Then the user enters the number of a channel that he or she wants to receive with the numeral keys included in the user interface 31 (202, 203).

After the user enters a channel number selected by user preference, the TX/RX data manipulator 28 generates channel selection signal data that is receivable by the portable terrestrial digital broadcast receiver unit 1 (204).

This signal data is input to the modulator/demodulator 27 and digitally modulated. The TX/RX section 26 converts the thus modulated signal data into RF signal carriers on a predetermined radio channel which are, in turn transmitted from the antenna 25 to the portable terrestrial digital broadcast receiver unit 1 (205).

At the portable terrestrial digital broadcast receiver unit 1, the channel selection signal carriers are received by its antenna 9 from which they are input to the RX circuit where they are converted into intermediate frequency signals. The intermediate frequency signals are digitally demodulated by the demodulator 11. The received and digitally demodulated signals are checked by the received data processor 12 as to whether the received channel selection data is valid (212).

If the received channel selection data specifies a channel that is invalid, for example, it does not exist, the TX data manipulator 6 generates an error code that is receivable by the portable terrestrial digital broadcast display unit 2 (213).

If the received channel selection data is valid, the portable terrestrial digital broadcast receiver unit 1 receives the user-selected channel by the antenna 3 and the received broadcast carriers on that channel are processed through the TV broadcast receiver 4 and OFDM demodulator 5 (215).

After demodulated, the MPEG4-encoded video data (may include audio in some case) is manipulated by the TX data manipulator 6 into video data that is receivable by the portable terrestrial digital broadcast display unit 2 (216).

The above error code or the manipulated video data is input to the modulator 7, digitally modulated, and passed to the TX circuit 8. The TX circuit 8 converts it into RF carries of error code or video on a predetermined radio channel and transmits the RF carriers from the antenna 9 to the portable terrestrial digital broadcast display unit 2 (214, 217).

At the portable terrestrial digital broadcast display unit 2, the RF carriers are received by its antenna 25 from which they are input to the TX/RX section 26 where they are converted into intermediate frequency signals. The intermediate frequency signals are digitally demodulated by the modulator/demodulator 27. The TX/RX data manipulator 28 judges whether the received and digitally demodulated signals constitute the error code or video data (206, 207).

If the error code is obtained, an alarm sound is uttered from a sounder (no shown) or an error message is presented on the display 32 (208).

If video data signals are obtained, they are decoded by the MPEG4 decoder 29 and the reproduced motion picture is output on the display 32 (209).

Figure 3:
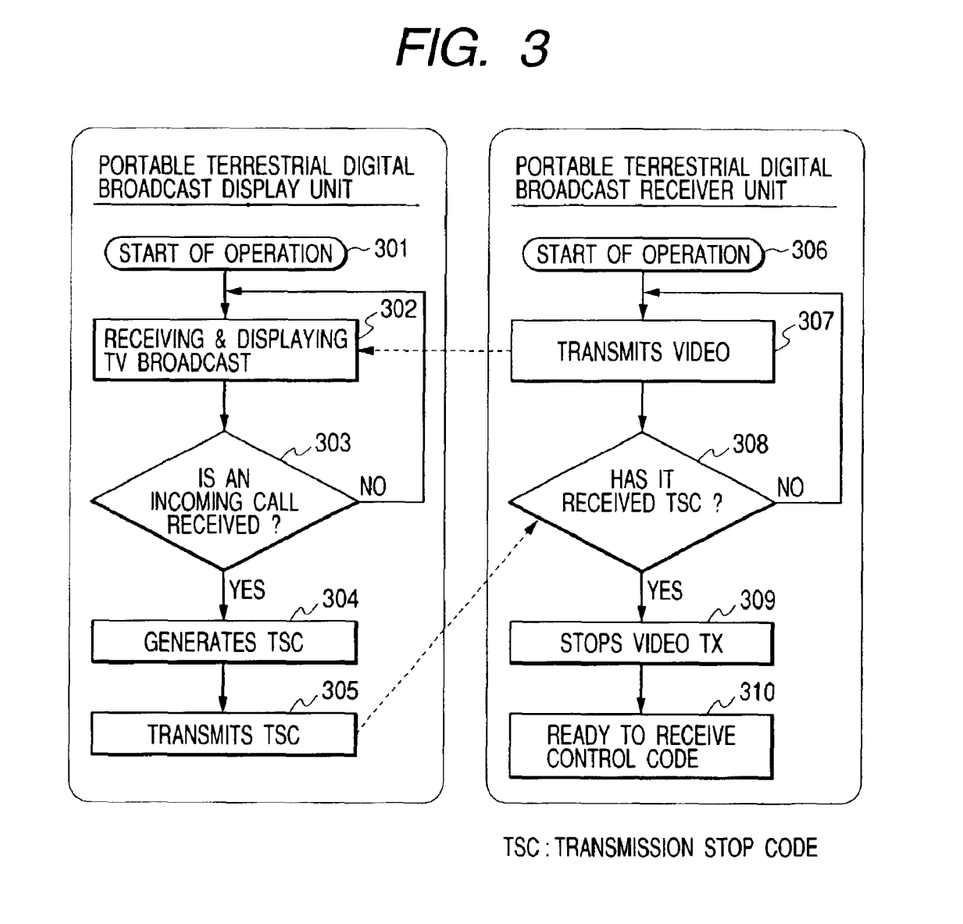
FIG. 3 is a flowchart explaining the operation in another phase of the portable terrestrial digital broadcast reception system of Embodiment 1.

Next, the operation in another phase of the portable terrestrial digital broadcast reception system of the present invention will be explained, using FIG. 1 and FIG. 3 that illustrates an operation flow in another phase.

Assume that communication between the portable terrestrial digital broadcast receiver unit 1 and the portable terrestrial digital broadcast display unit 2 is established. That is, at the portable terrestrial digital broadcast display unit 2, the foregoing steps 201 to 209 are performed, and at the portable terrestrial digital broadcast receiver unit 1, the foregoing steps 210 to 217 are performed (301, 306).

The communication between the portable terrestrial digital broadcast receiver unit 1 and the portable terrestrial digital broadcast display unit 2 continues (302, 307).

The portable terrestrial digital broadcast display unit 2 with portable cellular telephone functionality judges whether an incoming call is received by it (303).

If an incoming call is received, the display 32 that was displaying the motion picture of a TV broadcast changes to the display mode of the cellular telephone receiving an incoming call under the control of the controller 33. The TX/RX data manipulator 28 generates a transmission stop code (TSC) that is receivable by the portable terrestrial digital broadcast receiver unit 1 (304).

The TSC is input to the modulator/demodulator 27 and digitally modulated. The TX/RX section 26 converts the thus modulated TSC into RF carriers of the TSC on a predetermined radio channel and transmits the RF carriers of the TSC from the antenna 25 to the portable terrestrial digital broadcast receiver unit 1 (305).

At the portable terrestrial digital broadcast receiver unit 1, the TSC is received by its antenna 9 from which it is input to the RX circuit 10 where it is converted into intermediate frequency signals. The signals are digitally demodulated by the demodulator 11. When the received data processor 12 finds that the received and digitally demodulated signals constitute the TSC, the receiver unit stops transmission of video data under the control of the controller 33 (308, 309).

The portable terrestrial digital broadcast receiver unit 1 becomes ready to receive control code and remains in this state until channel selection signal carriers are received by the antenna 9 and processed by the RX circuit 10 and demodulator 11, that is, control code representing new channel selection data is received (310).

According to Embodiment 1, as described above, the user operates his or her portable cellular telephone or the like to use it as a display unit for terrestrial digital broadcasts. Thus, the terminal the user actually takes in hand for this purpose can be made slim and light. Because the terrestrial digital broadcast receiving function with mobility is separate from the mobile terminal such as the portable cellular telephone, the reception of terrestrial digital broadcasting does not have a direct effect on the consumption of the battery of the portable telephone.

FIG. 4 shows the structural diagrams of a receiver unit and a display unit constituting a portable digital broadcast reception system according to a preferred Embodiment 2 of the present invention. Of the above receiver and display units, essential function components that correspond to those shown in FIG. 1 are assigned the same reference numbers as in FIG. 1 and the explanation of their operation is not repeated. Additional components in FIG. 4 are RF units 40, 47, a TX/RX data manipulator 41, RF unit controllers 42, 48, RF unit connectors 43, 49, a modulator/demodulator 44, a TX/RX section 45, and an antenna 46.

Figure 4A:
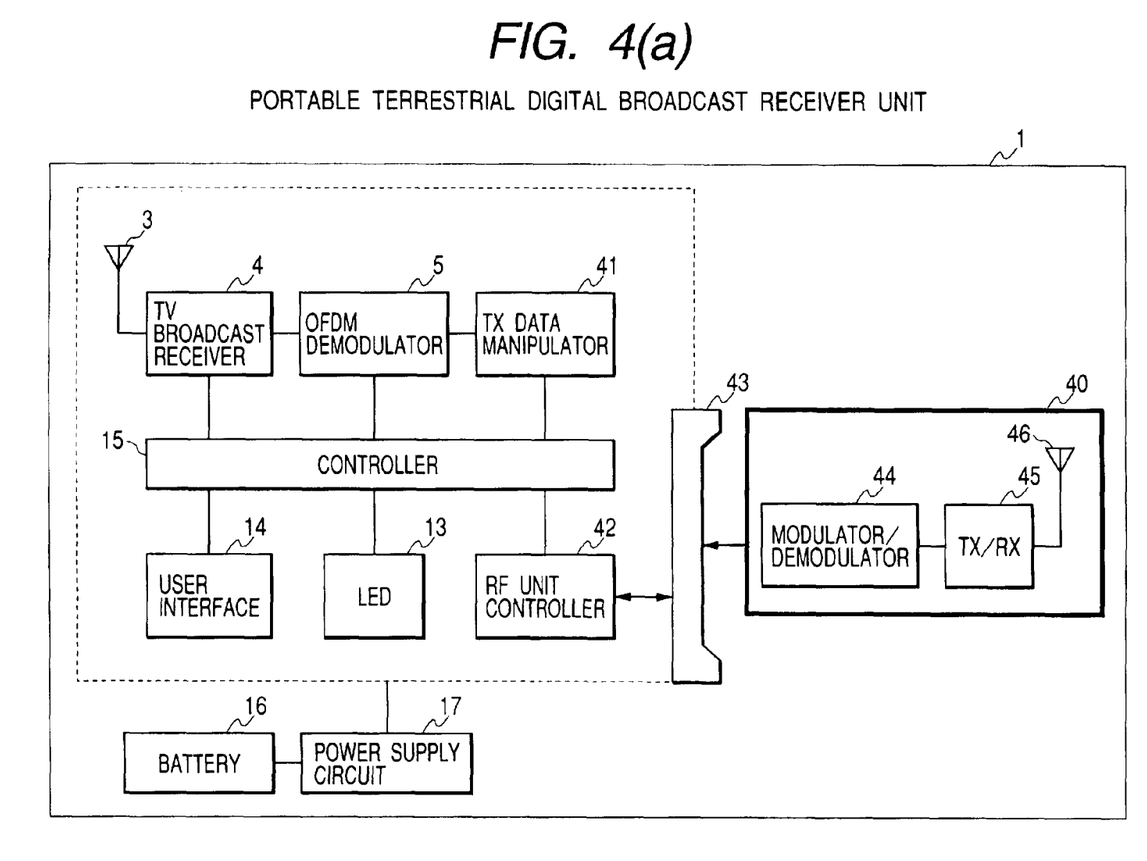
Figure 4B:
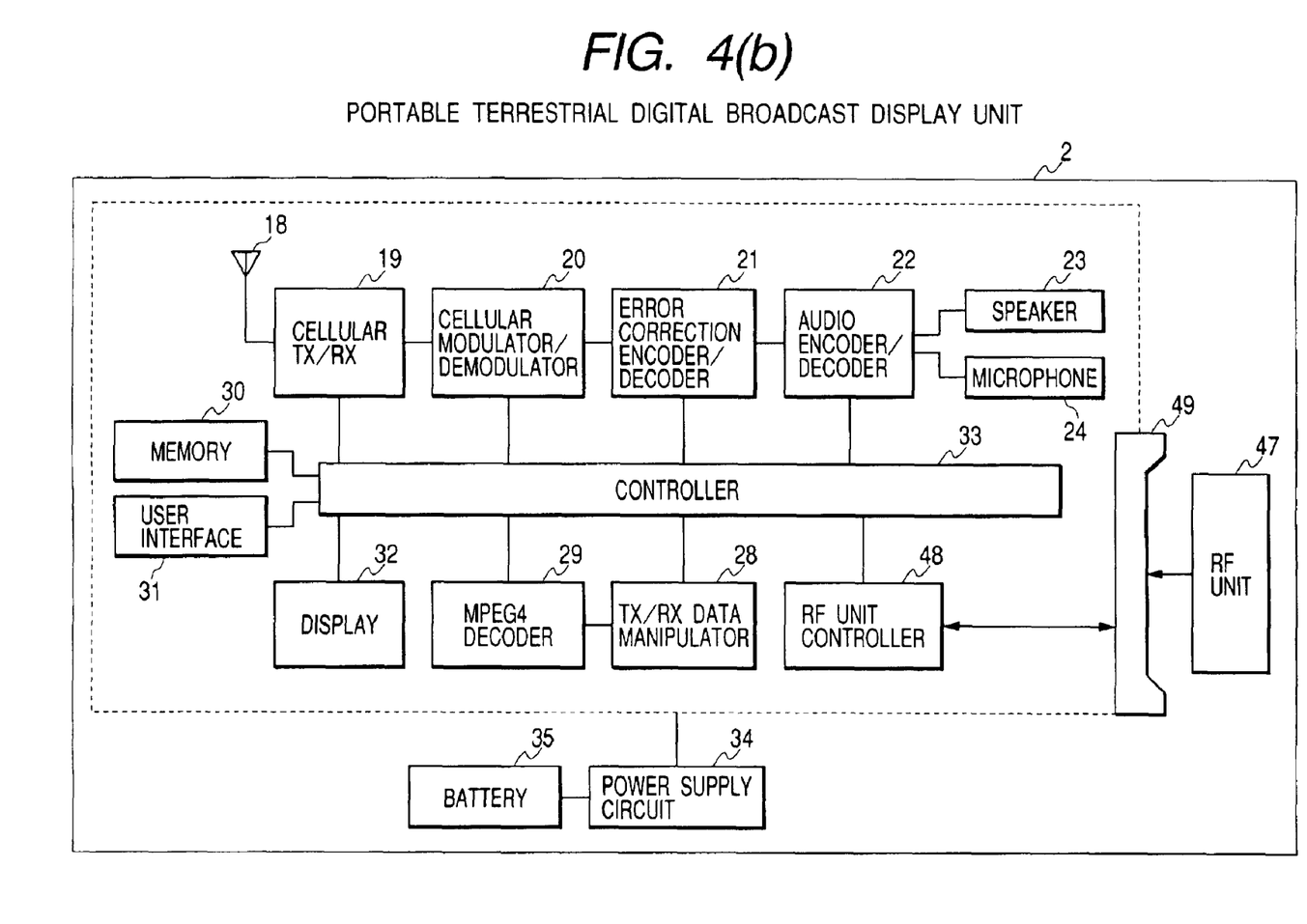

In FIG. 4A, the RF unit 40 comprises the modulator/demodulator 44, TX/RX section 45, and antenna 46 and performs the same function as fulfilled by the components within a block marked off with bold lines in FIG. 1. The TX/RX data manipulator 41 performs the same function as fulfilled by the TX data manipulator 6 and the received data processor 12 shown in FIG. 1. In FIG. 4B, the RF unit 47 performs the same function as fulfilled by the modulator/demodulator 27, TX/RX section 26, and antenna 25 shown in FIG. 1.

The RF unit 40 is attached to the RF unit connector 43. The RF unit controller 42 feeds power to the RF unit 40 and controls the RF unit 40 to implement the same operation as done by the portable terrestrial digital broadcast receiver unit described with reference to FIG. 1. The RF unit 47 is attached to the RF unit connector 49. The RF unit controller 48 feeds power to the RF unit 47 and controls the RF unit 47 to implement the same operation as done by the portable terrestrial digital broadcast display unit described with reference to FIG. 1.

According to Embodiment 2, as described above, the same advantage is obtained as noted for the foregoing Embodiment 1. Moreover, the attachable/detachable RF units are used as the radio transmission/reception means of both the portable terrestrial digital broadcast receiver and display units. The RF units can be detached from the main units when the units are not in use or the cellular telephone function of the portable display unit is used. Thus, the battery power of the units can be saved and the weight of the terminal to be carried by the user in hand can be reduced. Furthermore, the RF unit for the display unit can be attached to other types of terminals with mobility such as a notebook personal computer and PDA. A terrestrial digital broadcast can be received by the receiver unit, transferred to such terminals, and displayed thereon.

FIG. 5 shows the structural diagrams of a receiver unit and a display unit constituting a portable digital broadcast reception system according to a preferred Embodiment 3 of the present invention. Of the above receiver and display units, essential function components that correspond to those shown in FIG. 1 and FIG. 4 are assigned the same reference numbers as in FIG. 1 and FIG. 4 and the explanation of their operation is not repeated. Additional components in FIG. 5 are radio communication units 50, 55, radio communication unit controllers 51, 53, and radio communication unit connectors 52, 53.

Figure 5A:
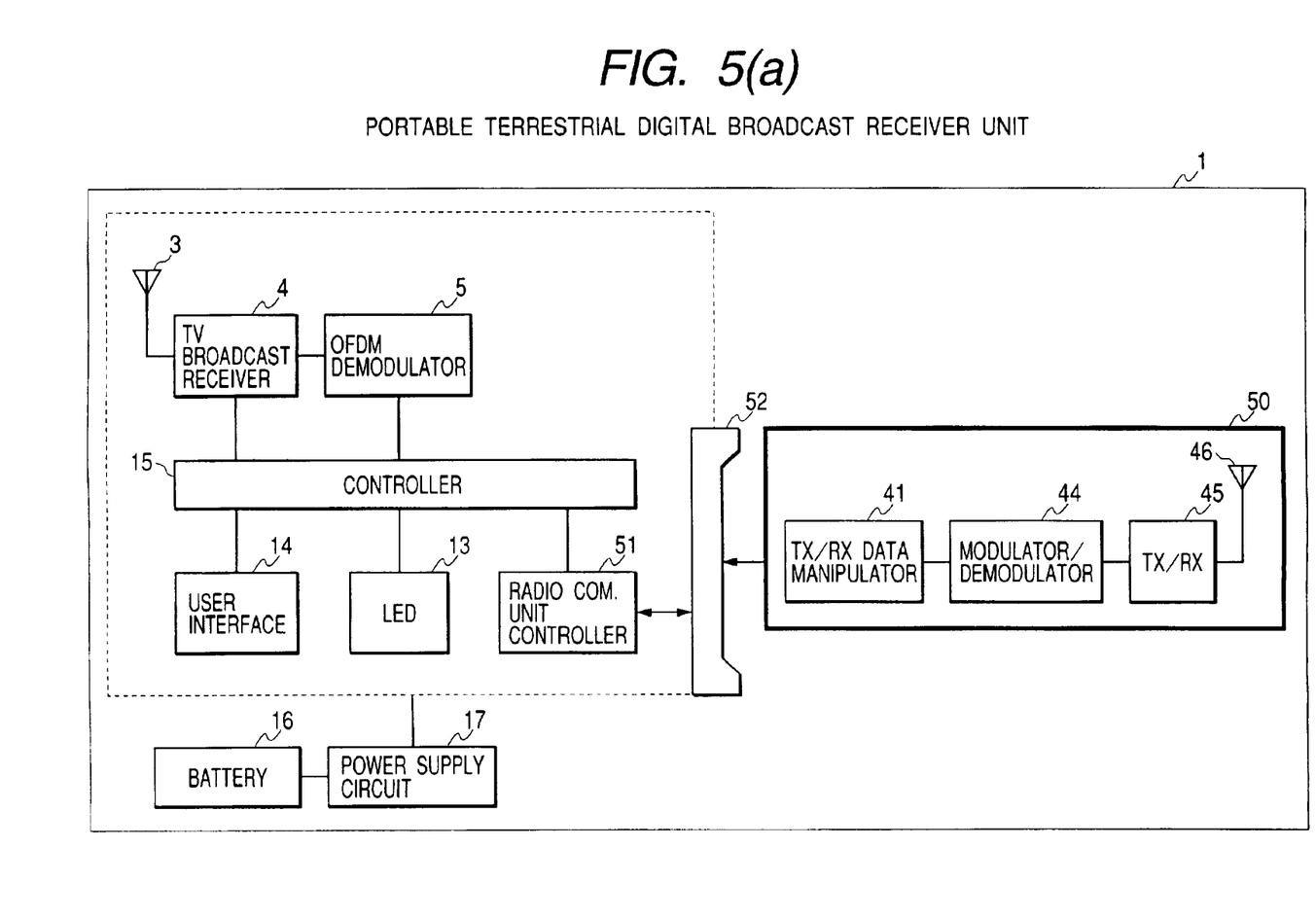
Figure 5B:
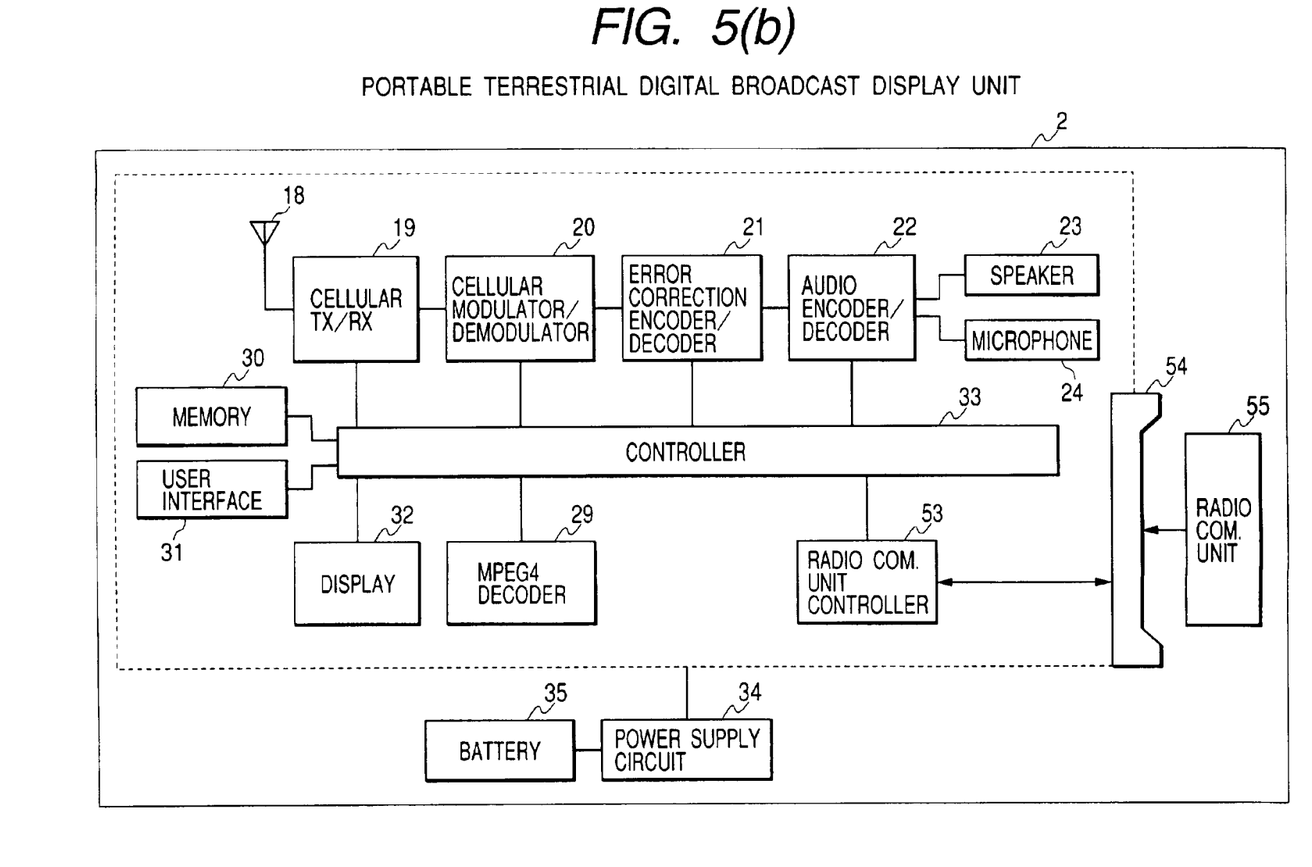

In FIG. 5A, the radio communication unit 50 comprises a TX/RX data manipulator 41, modulator/demodulator 44, TX/RX section 45, and antenna 46. The radio communication unit 50 performs the same function as fulfilled by the components within a block marked off with bold lines in FIG. 1 and the TX data manipulator 6 and received data processor 12 blocks in FIG. 1. In FIG. 5B, the radio communication unit 55 performs the same function as fulfilled by the TX/RX data manipulator 28, modulator/demodulator 27, TX/RX section 26, and antenna 25 shown in FIG. 1.

The radio communication unit 50 is attached to the radio communication unit connector 52. The radio communication unit controller 51 feeds power to the radio communication unit 50 and controls the radio communication unit 50 to implement the same operation as done by the portable terrestrial digital broadcast receiver unit described with reference to FIG. 1. The radio communication unit 55 is attached to the radio communication unit connector 54. The radio communication unit controller 53 feeds power to the radio communication unit 55 and controls the radio communication unit 55 to implement the same operation as done by the portable terrestrial digital broadcast display unit described with reference to FIG. 1.

According to Embodiment 3, as described above, the same advantage is obtained as noted for the foregoing Embodiments 1 and 2. Moreover, as the attachable/detachable radio communication units, if products conforming to the Bluetooth radio standards are used, the same advantage can be obtained as will be achieved by a preferred Embodiment 4 of the present invention, which will be described later.

While the Embodiments described hereinbefore assume that a portable cellular telephone is used as the display unit, other types of terminals with mobility such as notebook personal computers, PDAs, and car navigators, can be used as the display unit, providing they include the same constitution set forth hereinbefore.

A plurality of receiver units and a plurality of display units having their functions described in the foregoing embodiments may be used to constitute a terrestrial digital broadcast reception system of a radio network type. The system allows distributing terrestrial digital broadcast programs to the display units, according to user preference.

Figure 6:
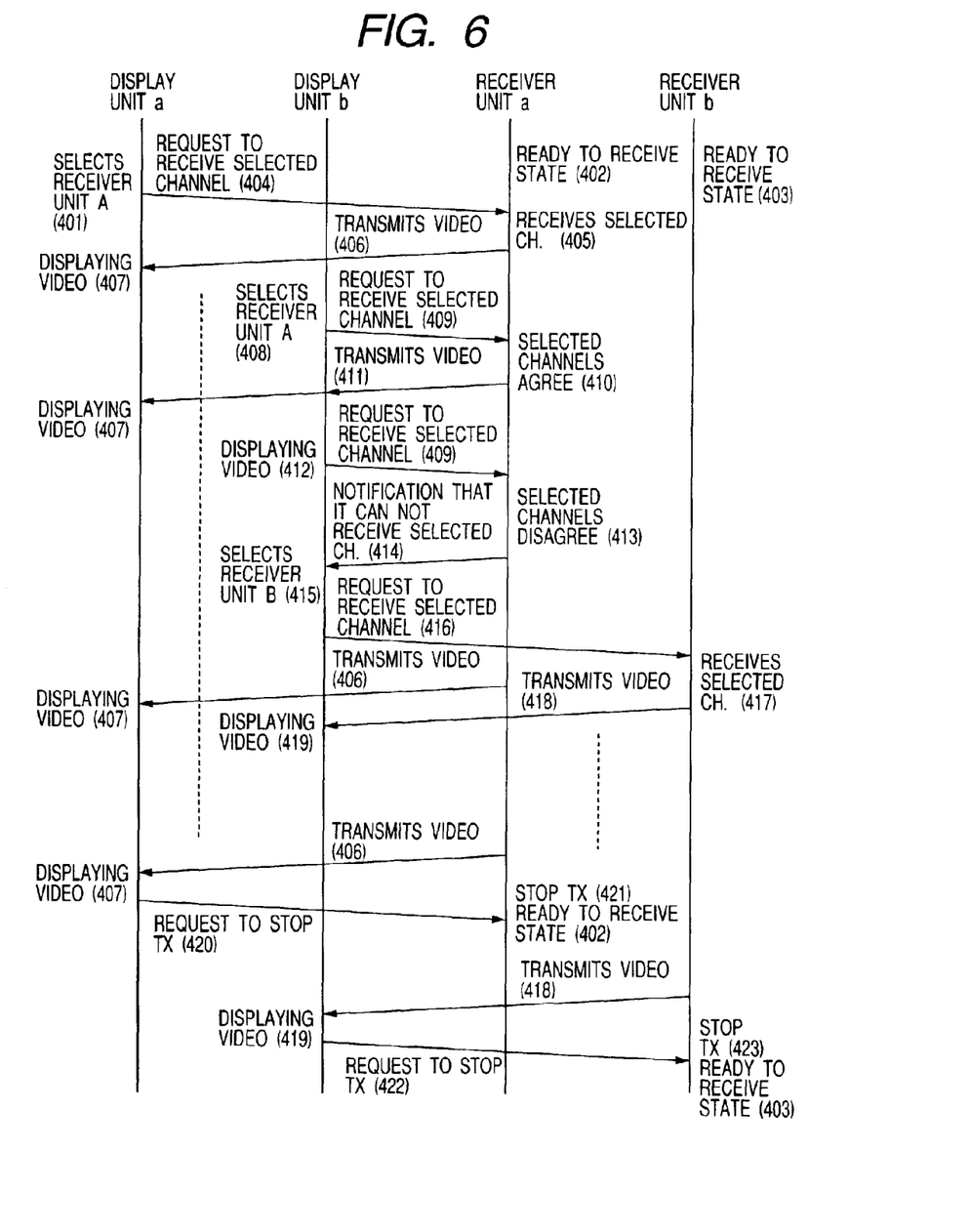
FIG. 6 illustrates one example of operation sequence in a portable terrestrial digital broadcast reception system according to a preferred Embodiment 4 of the present invention.

FIG. 6 illustrates one example of operation sequence in a portable terrestrial digital broadcast reception system according to a preferred Embodiment 4 of the present invention. In Embodiment 4, a plurality of terminals having the functionality of the portable terrestrial digital broadcast receiver unit 1 and a plurality of terminals having the functionality of the portable terrestrial digital broadcast display unit 2, as illustrated in FIGS. 1, 4, and 5, are used to constitute a radio network that functions as the above system. Operation in this system will be explained below.

A display unit A selects a receiver unit A (401), sets a channel to receive as selected by its user, and transmits a request (404) to receive the selected channel to the receiver unit A. On receiving this request (404), the receiver unit A leaves the ready to receive state (402) and receives the selected channel (405). Then, the receiver unit A transmits video data (406) to the display unit A. The display unit A receives and displays the video data (407).

While the communication between the display unit A and the receiver unit B continues, another display unit B selects the receiver unit A (408), sets a channel to receive as selected by its user, and transmits a request (409) to receive the selected channel to the receiver unit A. At this time, if the selected channel specified in the request (404) and the selected channel specified in the request (409) agree (410), the receiver unit A transmits video data (411) to the display unit A and the display unit B. The display unit B receives and displays the video data (412). After a while, the display unit B sets another channel to receive as selected by its user and transmits a request (409) to receive the selected channel to the receiver unit A. At this time, the selected channel specified in the request (404) and the selected channel specified in the request (409) disagree (143), and, therefore, the receiver unit A transmits a notification (414) that it cannot receive the selected channel to the display unit B. On receiving this notification (414), the display unit B then selects another receiver unit B (415), sets a channel to receive as selected by its user, and transmits a request (416) to receive the selected channel to the receiver unit B. On receiving this request (416), the receiver unit B leaves the ready to receive state (403) and receives the selected channel (417). Then, the receiver unit B transmits video data (418) to the display unit B. The display unit B receives and displays the video data (419).

Thereafter, when the display unit A terminates the display of the picture broadcasted on the selected channel, it transmits a request (420) to stop transmission to the receiver unit A. On receiving this request (420), the receiver unit A stops the transmission of video data (421) and enters the ready to receive state (402). Similarly, when the display unit B terminates the display of the picture broadcasted on the selected channel, it transmits a request (422) to stop transmission to the receiver unit B. On receiving this request (422), the receiver unit B stops the transmission of video data (423) and enters the ready to receive state (403).

Figure 7:
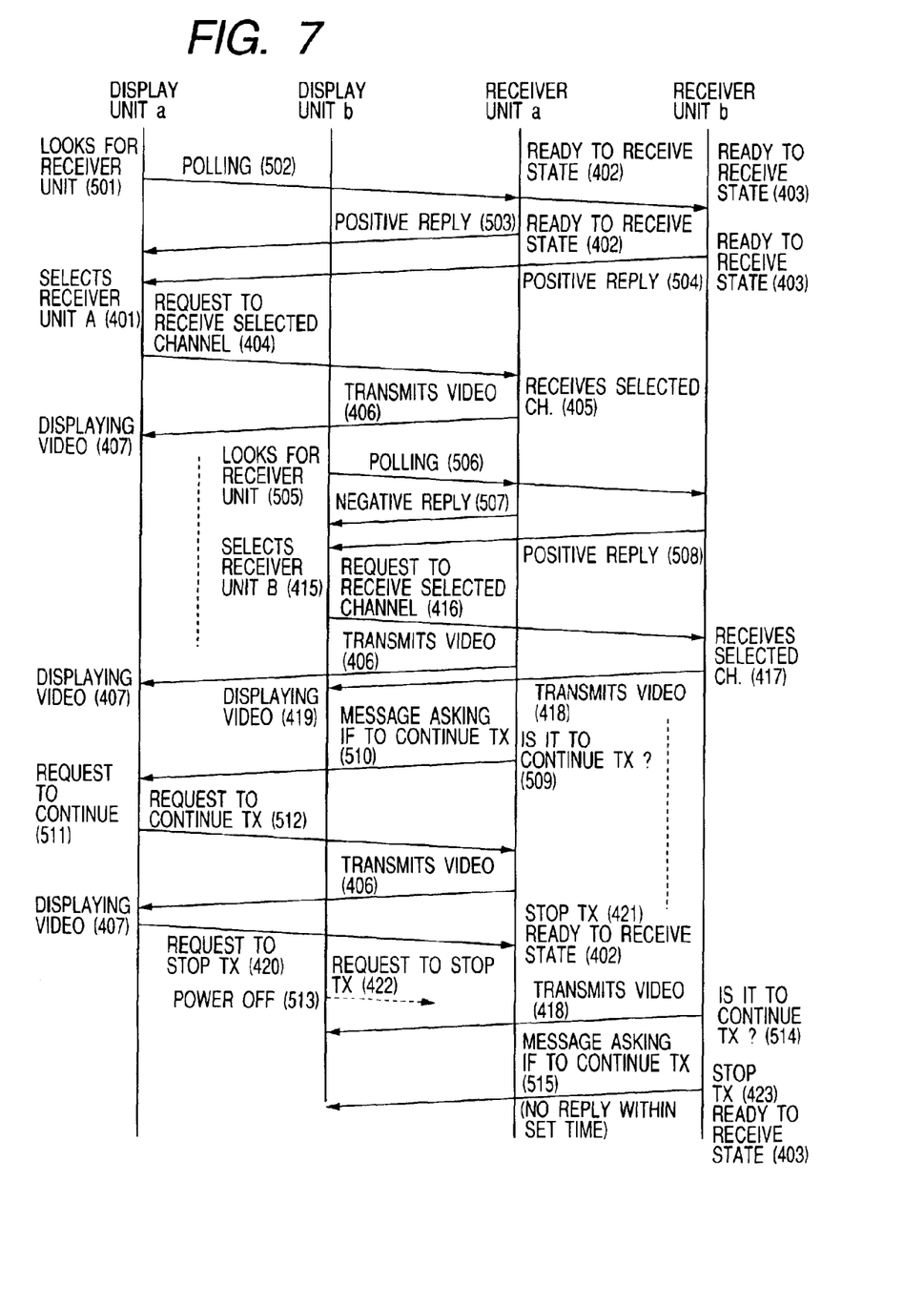
FIG. 7 illustrates another example of operation sequence in the portable terrestrial digital broadcast reception system of Embodiment 4.

FIG. 7 illustrates another example of operation sequence in the portable terrestrial digital broadcast reception system of Embodiment 4; this operation sequence differs from that illustrated in FIG. 6. Steps corresponding to those shown in FIG. 6 are assigned the same reference numbers and explanation thereof is not repeated.

To look for a receiver unit (501), first, the display unit A transmits polling (502) that asks if the receiver unit can receive a selected channel to the receiver units A and B. On receiving this poling (502), the receiver unit A leaves the ready to receive state (402) and transmits a positive reply (503) that it can receive a selected channel to the display unit A. It returns to the ready to receive state (402). Similarly, on receiving the poling (502), the receiver unit B leaves the ready to receive state (403) and transmits a positive reply (504) that it can receive a selected channel to the display unit A. It returns to the ready to receive state (403). On receiving the positive replies (503, 504) from the receiver units A and B, the display unit A selects the receiver unit A (401) and then receives and displays video data (407).

During the communication between the display unit A and the receiver unit A, the display unit B transmits polling (506) that asks if the receiver unit can receive a selected channel to the receiver units A and B, thus looking for a receiver unit (505). On receiving this polling (506), the receiver unit A transmits a negative reply (507) that it cannot receive a selected channel to the display unit B because it is now engaged in the communication with the display unit A. The receiver unit B, on the other hand, leaves the ready to receive state (403) upon receiving the polling (506) and transmits a positive reply (508) that it can receive a selected channel to the display unit B. It returns to the ready to receive state (403). The display unit B selects the receiver unit B (415) that transmitted the positive reply (508) to it and then receives and displays video data (419).

In this embodiment, a function of transmitting a message asking if to continue data transmission from a receiver unit to a display unit is also provided just in case the display unit should fail to receive video data transmitted from the receiver unit or the receiver unit should fail to receive a request to stop transmission from the display unit due to bad radio transmission condition. (Timing of this message transmission may be set at intervals of given time or after the predetermined number of times video data has been transmitted to the display unit.) To decide whether to continue video data transmission (509), the receiver unit A transmits a message (510) asking if to continue data transmission to the display unit A. If the display unit A still continues to receive video data (511), it transmits a request (512) to continue transmission to the receiver unit A. The receiver unit A receives the request (512) to continue transmission. At this time, the receiver unit A continues to transmit video data because it can judge that the radio transmission path between the display unit A and the receiver unit A is in good condition. However, when the display unit B has been powered off (513) or when the receiver unit B failed to receive the request (422) to stop transmission due to bad radio transmission condition, the receiver unit B would remain in the state of transmitting video data (418). To avoid this, the following is performed. To decide whether to continue video data transmission (514), the receiver unit B transmits a message (515) asking if to continue data transmission to the display unit B. If the receiver unit B receives no reply to this message from the display unit B within a given time, the receiver unit B stops video data transmission because it can judge that the radio transmission path between the display unit B and the receiver unit B is in bad condition.

As described above, a terrestrial digital broadcast reception system of a radio network type can be constituted with a plurality of receiver units and a plurality of display units having the functions described in the foregoing embodiments. In this system, terrestrial digital broadcast programs can be distributed to the display units, according to user preference and in the operation sequence different from that shown in FIG. 6.

While the described embodiments of the present invention are illustrative of the system for receiving terrestrial digital TV broadcasting through the use of an OFDM modulation method, it will be appreciated that the disclosed system may be built to receive other modes of broadcasting. In some embodiments, the block comprising the antenna 3, TV broadcast receiver 4, and OFDM demodulator 5 may be reconfigured to receive terrestrial or satellite digital audio broadcasting. Also, in some embodiments, the disclosed receiver unit may apply to reception using a modulation method other than the OFDM. Also, in some embodiments, the disclosed receiver unit may be configured to function as a CS/BS compatible receiver.

As is obvious from the described embodiments, according to the present invention, the user operates his or her portable cellular telephone or the like to use it as the display unit for digital broadcasts. Thus, the terminal the user actually takes in hand for this purpose can be made slim and light. Because the digital broadcast receiving function with mobility is separate from the mobile terminal such as the portable cellular telephone, the reception of digital broadcasting does not have a direct effect on the consumption of the battery of the portable telephone. A portable digital reception system and a portable terminal as a constituent part of the system can be provided, the portable terminal having the functions for receiving the service of distributing digital broadcasts to portable terminals.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications falling within the ambit of the appended claims.

We claim:

1. A digital broadcast channel reception system comprising a receiver unit and a display unit, wherein:
   said receiver unit comprises:
   (a) a digital broadcast receiver which receives digital broadcast carriers;
   (b) a demodulator which demodulates the digital broadcast carriers received by said digital broadcast receiver;
   (c) a first convertor which converts encoded digital signals demodulated by said demodulator into radio communication signal carriers in a predetermined form; and
   (d) a first radio carriers transmitting/receiving part which transmits the radio communication signal carriers output by said first convertor;
   said display unit, which is equivalent in functionality to a mobile portable terminal, comprises:
   (i) a second radio carriers transmitting/receiving part which receives the carriers transmitted by said first radio carriers transmitting/receiving part;
   (ii) a second convertor which converts said radio communication signal carriers received by said second radio carriers transmitting/receiving part into signals in the same form as said encoded digital signals;
   (iii) a decoder which decodes the signals output by said second convertor; and
   (iv) a display which displays content reproduced from the decoded signals, and
   at least either a set of said first convertor and said first radio carriers transmitting/receiving part or a set of said second convertor and said second radio carriers transmitting/receiving part is a detachable structure.

2. A digital broadcast channel reception system according to claim 1, wherein said receiver unit is capable of radio communication with a plurality of display units including said display unit and the display unit of another digital broadcast channel reception system for transmitting said radio communication signal carriers thereto.

3. A digital broadcast channel reception system according to claim 1, wherein said display unit is capable of radio communication with a receiver unit selected from a plurality of receiver units including said receiver unit and the receiver unit of another digital broadcast channel reception system for receiving said radio communication signal carriers therefrom.

4. A digital broadcast channel reception system according to claim 1, wherein said display unit further comprises:
   a cellular communication signal carriers transmitting/receiving part which transmits and receives cellular communication signal carriers arranged in a form different from the form of said radio communication signal carriers;
   a processor which modulates, demodulates, codes, and decodes said cellular communication signal carriers; and
   an input/output part which inputs and outputs the signals converted by said second convertor.

5. A digital broadcast channel reception system according to claim 4, wherein said digital broadcast receiver is equipped with an antenna and said cellular communication signal carriers transmitting/receiving part is equipped with an antenna and the antenna of said digital broadcast receiver is larger than the antenna of said cellular communication signal carriers transmitting/receiving part.

6. A digital broadcast channel reception system according to claim 4, wherein said cellular communication signal carriers are speech signals.

7. A digital broadcast channel reception system according to claim 4, wherein said cellular communication signal carriers are signals that are transmitted and received via the Internet and images are reproduced therefrom and visualized on said display.

8. A digital broadcast channel reception system according to claim 1, wherein said first convertor and/or said second convertor carries out signal modulation or demodulation.

9. A digital broadcast channel reception system according to claim 1, wherein said first convertor sand/or said second convertor carries out signal data manipulation, signal frequency conversion, and signal modulation or demodulation.

10. A digital broadcast channel reception system according to any one of claims 1–9, wherein said display unit further comprises user interface part(s) which enters digital broadcast channel selection data and is controlled, according to said channel selection data which is transmitted by said second radio carriers transmitting/receiving part and received by said first radio carriers transmitting/receiving part, so that said digital broadcast receiver receives digital broadcast carriers on a user preference channel.

11. A digital broadcast channel reception system according to claim 1, wherein said receiver unit is portable.

\* \* \* \* \*